United States Patent

Larson

[11] Patent Number: 5,967,707
[45] Date of Patent: Oct. 19, 1999

[54] SHORT-HOLE DRILL BIT

[75] Inventor: Fred R. Larson, Zeeland, Mich.

[73] Assignee: Diesel Technology Company, Kentwood, Mich.

[21] Appl. No.: 09/124,482

[22] Filed: Jul. 29, 1998

[51] Int. Cl.⁶ .............................. B23B 35/00; B23B 51/02
[52] U.S. Cl. .............................. 408/1 R; 408/83; 408/229
[58] Field of Search ................................ 408/1 R, 59, 81, 408/83, 144, 199, 226, 227, 229, 230, 705

[56] References Cited

U.S. PATENT DOCUMENTS

| | | |
|---|---|---|
| Re. 26,452 | 9/1968 | Dearborn . |
| 499,098 | 6/1893 | Comstock . |
| 1,323,278 | 12/1919 | Hoagland . |
| 1,454,851 | 5/1923 | Gerdil . |
| 2,188,928 | 2/1940 | Stolle . |
| 2,276,532 | 3/1942 | Welty . |
| 2,289,065 | 7/1942 | Oliver . |
| 2,325,535 | 7/1943 | Nordberg ................................ 408/59 |
| 2,354,985 | 8/1944 | Davis . |
| 3,120,766 | 2/1964 | Zagar . |
| 3,147,645 | 9/1964 | Cooper . |
| 3,260,139 | 7/1966 | Sanborn . |
| 3,361,014 | 1/1968 | McClennan . |
| 3,400,617 | 9/1968 | Sanborn . |
| 4,212,569 | 7/1980 | Andersson et al. .................... 408/226 |
| 4,338,050 | 7/1982 | Ozer et al. . |
| 4,395,169 | 7/1983 | Kashiwagi et al. . |
| 5,217,332 | 6/1993 | Takasaki et al. ........................ 408/227 |
| 5,443,585 | 8/1995 | Kawase et al. . |

FOREIGN PATENT DOCUMENTS

| | | |
|---|---|---|
| 523484 | 4/1955 | Italy . |
| 55-54111 | 4/1980 | Japan . |
| 55-54112 | 4/1980 | Japan . |
| 62-9811 | 1/1987 | Japan . |
| 62-34712 | 2/1987 | Japan . |
| 62-208809 | 9/1987 | Japan . |
| 63-102813 | 5/1988 | Japan . |
| 245311 | 10/1988 | Japan .................................. 408/229 |
| 278711 | 11/1988 | Japan .................................. 408/229 |
| 1-51216 | 2/1989 | Japan . |
| 1240215 | 9/1989 | Japan .................................. 408/144 |
| 44197 | 1/1961 | Poland . |

*Primary Examiner*—Daniel W. Howell
*Attorney, Agent, or Firm*—Brooks & Kushman P.C.

[57] ABSTRACT

A short-hole drill bit and short-hole drilling method in which a drill bit has a unitary body with a substantially V-shaped flute and a support pad are provided. The unitary body has a shank portion and a working portion. The flute extends axially along the working portion, and defines a cutting edge and a passive edge at the body periphery. The support pad is located along a portion of the body periphery. The support pad is located with respect to the cutting edge based on a normal cutting force and a tangential cutting force at the cutting edge. The resultant cutting force is directed at the support pad to cause the support pad to center the short-hole drill bit during operation.

20 Claims, 3 Drawing Sheets

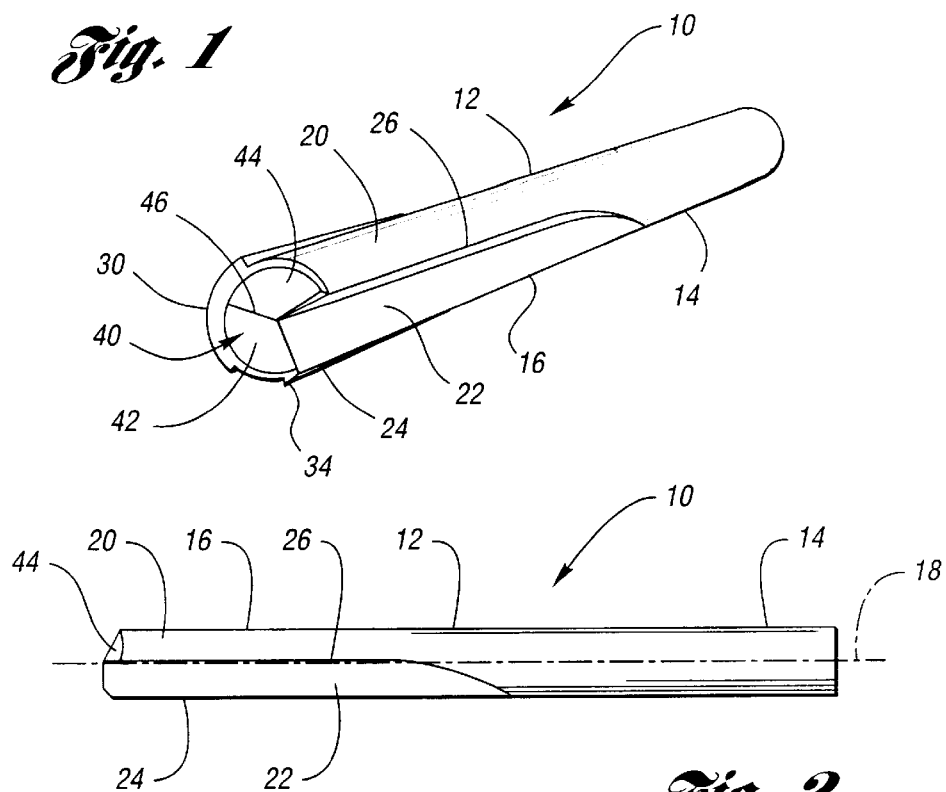
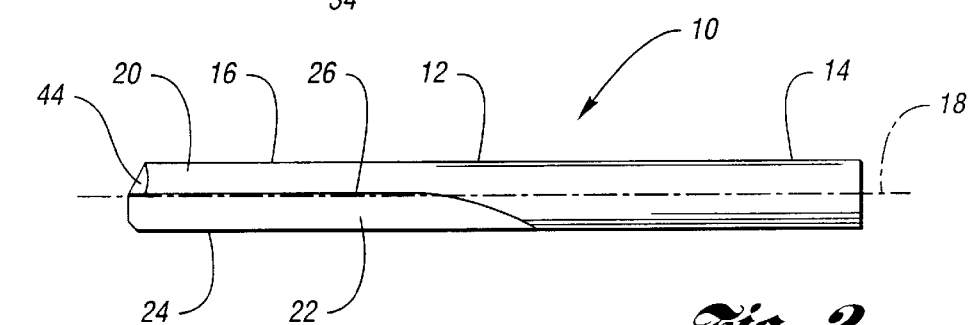
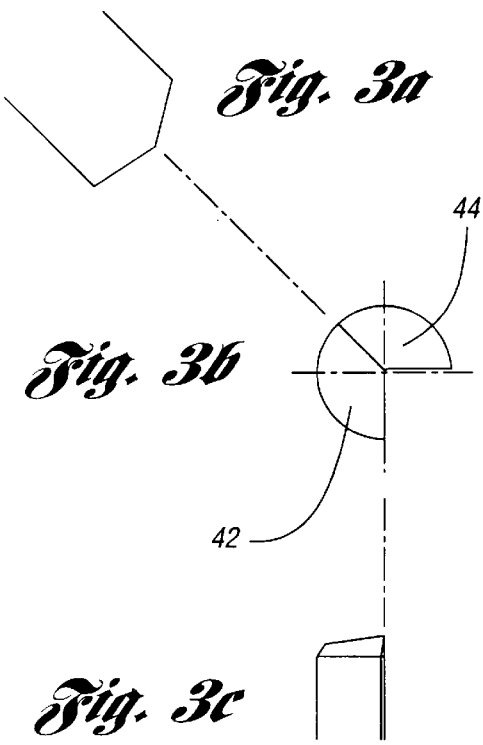
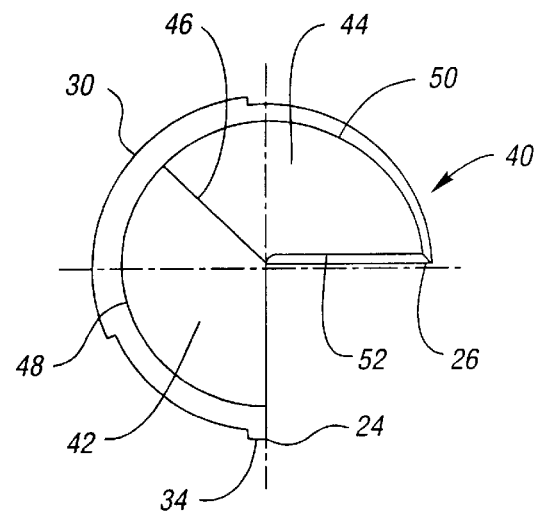

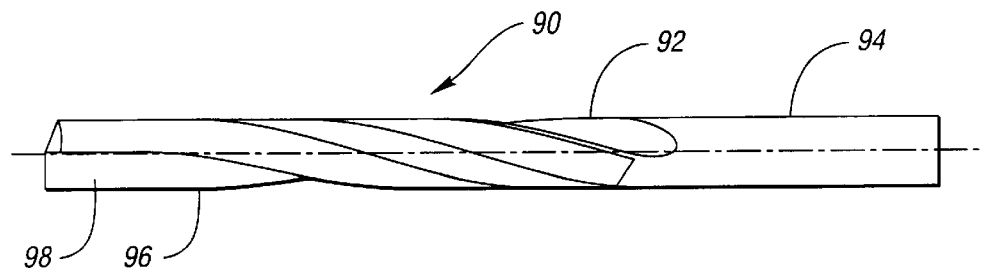
*Fig. 7*
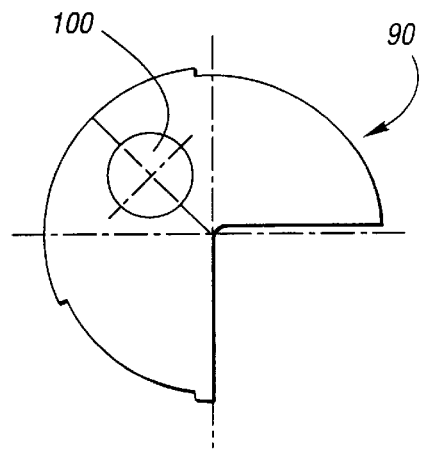
*Fig. 8a*
*Fig. 8b*
*Fig. 8c*
*Fig. 9*
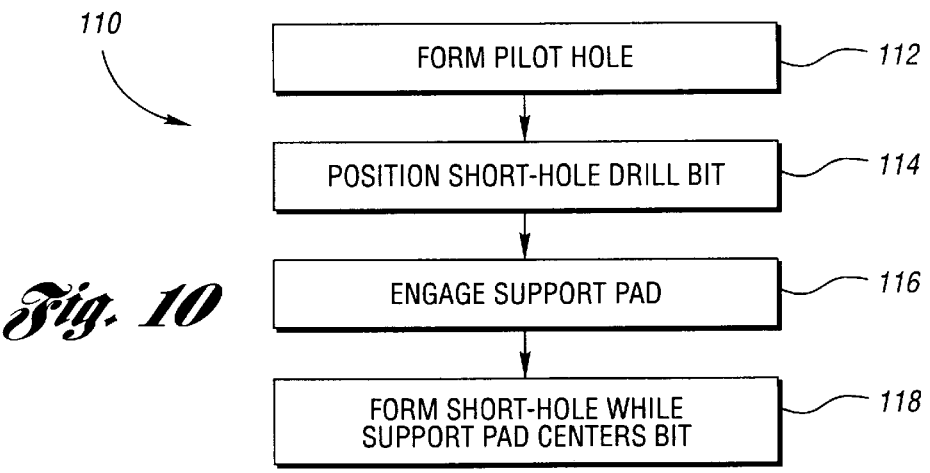
*Fig. 10*

SHORT-HOLE DRILL BIT

TECHNICAL FIELD

The present invention relates to short-hole drill bits including short-hole reamers.

BACKGROUND ART

In conventional short-hole drilling, at least two operations are required to form a hole with a strict tolerance. First, a typical drill bit is used to drill a hole having a diameter slightly smaller than the desired diameter of the final hole. Thereafter, a single or multi-point reamer is used to ream the drilled hole, increasing the diameter slightly, and making the final hole the desired size.

In addition to the expense associated with performing multiple operations for each hole, existing short-hole drilling techniques have other problems. In particular, sometimes it is desirable to drill a hole in a workpiece, where the hole being drilled will intersect a blind bore that is already formed in the workpiece. It is rather difficult to drill a hole that intersects an existing blind bore with existing short-hole drilling techniques.

With existing techniques, as a point on the reamer cuts the workpiece during reaming, normal and tangential cutting forces at the point cause the bit to bend slightly. When the point of the tool reaches the intersection of the blind bore with the hole being drilled, the drill bit reacts to the sudden reduction in cutting forces at the point, causing the point to extend slightly into the blind bore. When the point is about to rotate out of the blind bore region, the point may nick the workpiece where the hole being drilled meets the blind bore, and after a while, cause the hole being drilled to be out of specification.

Thus, in short-hole drilling, it is difficult to consistently drill straight holes that meet strict tolerances. Deep-hole drilling techniques have addressed similar problems related to centering a deep-hole drill bit. For example, a gun drill has a bit designed to center itself during drilling. However, there are several things about deep-hole drilling techniques that prevent the easy adaption of deep-hole drilling techniques to short-hole drilling. For example, a gun drill has a bit connected to a long steel shank that is brazed to the bit. The long steel shank bends very easily. As such, although a gun drill may do a good job of drilling a deep hole, a gun drill cannot do a very good job of reaming a deep hole because the long steel shank tends to flex during drilling. If the rough drilled hole that is to be reamed is not straight, the gun drill will simply follow the path of the pre-drilled hole. Thus, the gun drill will not self-center to form a clean bore meeting a strict tolerance.

For the foregoing reasons, there is a need for a short-hole drill bit and short-hole drilling method that overcomes the problems and limitations of the prior art.

DISCLOSURE OF INVENTION

It is, therefore, an object of the present invention to provide a short-hole drill bit for forming clean bores when the bore being formed intersects a blind bore.

It is another object of the present invention to provide a self-centering short-hole drill bit.

In carrying out at least one of the above objects, a short-hole drill bit is provided. The short-hole drill bit comprises a unitary body having a shank portion and a working portion. The body defines a central axis and has a periphery. A substantially V-shaped flute extends axially along the working portion. The flute defines a cutting edge and a passive edge at the body periphery. The short-hole drill bit further comprises a support pad located along a portion of the body periphery. The support pad is located with respect to the cutting edge based on a normal cutting force and a tangential cutting force at the cutting edge. A resultant cutting force is directed at the support pad to cause the support pad to center the short-hole drill bit during operation.

Further, in carrying out the present invention, a short-hole drill bit is provided. The short-hole drill bit comprises a unitary body having a shank portion and a working portion, a substantially V-shaped flute extending axially along the working portion, and a support pad along the body periphery. The support pad extends through a portion of the body periphery that is substantially opposite the flute such that a resultant cutting force at the cutting edge is directed at the support pad to cause the support pad to center the short-hole drill bit during operation.

Still further, in carrying out the present invention, a method for short-hole drilling workpiece is provided. The method comprises forming a pilot hole in the workpiece, and positioning a short-hole drill bit at the pilot hole. The short-hole drill bit has a unitary body having a shank portion and a working portion, a substantially V-shaped flute, and a support pad located with respect to the cutting edge such that a resultant cutting force is directed at the support pad. The method further comprises forming the short-hole in the workpiece, with the resultant cutting force directed at the support pad to cause the support pad to center the short-hole drill bit during operation.

The advantages associated with embodiments of the present invention are numerous. For example, embodiments of the present invention allow the forming of clean bores, even when the bore to be formed intersects an existing blind bore, with relatively few operations. That is, a short pilot hole, which only need be deep enough to allow initial centering of the short-hole drill bit of the present invention, may be formed. Then, the hole may be accurately drilled in one operation without the need for using a point reamer thereafter. Embodiments of the present invention make it possible to form clean bores with high accuracy, at decreased manufacturing costs.

The above objects and other objects, features, and advantages of the present invention are readily apparent from the following detailed description of the best mode for carrying out the invention when taken in connection with the accompany drawings.

BRIEF DESCRIPTION OF DRAWINGS

FIG. 1 is a pictorial view of a short-hole drill bit made in accordance with the present invention;

FIG. 2 is a side view of the short-hole drill bit shown in FIG. 1;

FIGS. 3(a), 3(b), and 3(c) depict the tip of the short-hole drill bit shown in FIG. 2;

FIG. 4 is an enlarged view of the tip of the short-hole drill bit of FIG. 2;

FIG. 7 is a side view of an alternative embodiment for a short-hole drill bit of the present invention;

FIGS. 8(*a*), 8(*b*), and 8(*c*) illustrate the tip of the short-hole drill bit shown in FIG. 7;

FIG. 9 is a enlarged view of the tip of the short-hole drill bit shown in FIG. 7; and FIG. 10 is a block diagram illustrating a method of the present invention for drilling a short-hole.

BEST MODE FOR CARRYING OUT THE INVENTION

Figure 5:
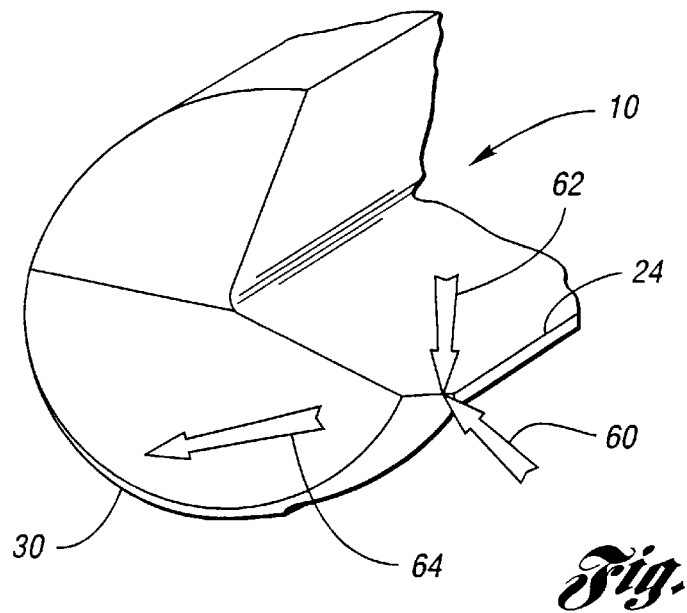
FIG. 5 is a schematic diagram illustrating cutting forces associated with short-hole drill bits of the present invention.

With reference to FIGS. 1–4, a short-hole drill bit of the present invention is generally indicated at 10. Drill bit 10 has a unitary body 12 with a shank portion 14, a working portion 16, and a central axis 18. Unitary shank and working portions 14 and 16, respectively, are advantageous in that a rigid hard drill bit is formed that does not have the bending problems associated with the long steel shanks of gun drills. Drill bit body 12 has a periphery 20. A substantially V-shaped flute 22 extends axially along working portion 16. Flute 22 defines a cutting edge 24 and a passive non-cutting edge 26 at body periphery 20. A support pad 30 is located along a portion of body periphery 20. Support pad 30 is located with respect to cutting edge 24 based on a resultant cutting force at cutting edge 24 during operation. Support pad 30 is located such that the resultant cutting force is directed at support pad 30 to cause support pad 30 to center drill bit 10 during operation. Preferably, flute 22 is a straight flute; however, alternatively a twisted flute may be used. Accordingly, if a twisted flute is used, a twisted support pad is used as well such that cross sections of the drill bit are substantially identical in that the pad is always located to receive the resultant cutting force throughout the length of the cutting edge.

Further, unitary body 12 is preferably formed of carbide, more particularly, a carbide with about 10% cobalt. Of course, other materials may be suitable for forming a sufficiently rigid drill bit. In addition to drill bit 10 being formed of a hard material, preferably body 12 has an abrasive resistant coating. Titanium Carbon Nitride (TiCN) is one example of a suitable abrasive resistant coating, and is preferred.

As best shown in FIG. 4, in a preferred embodiment, a short pad 34 is located along a portion of body periphery 20 at cutting edge 24. Short pad 34 extends less than about 10 degrees in a circumferential direction about body periphery 20. Further, it is preferred that support pad 30 extends more than about 90 degrees in a circumferential direction about body periphery 20. Of course, it is to be appreciated that the materials and dimensions mentioned above are examples of suitable materials and dimensions and that short-hole drill bits may be formed in accordance with the present invention having different materials and/or dimensions than those stated above.

Body working portion 16 defines a tip, generally indicated at 40, with a first surface 42 and a second surface 44. First surface 42 is located adjacent to cutting edge 24. Second surface 44 is located between passive edge 26 and first surface 42. To facilitate centering drill bit 10 within a pilot hole, it is preferred that first surface 42 is substantially perpendicular to body central axis 18, and that second surface 44 is chamfered with respect to first surface 42. As depicted, first surface 42 and second surface 44 share a common edge 46.

Due to the importance of the ability of drill bit 10 to center itself in a pilot hole, several features are preferred at tip 40. For example, first surface 42 and second surface 44 oriented as described immediately above are a preferred feature at tip 40. Further, the periphery of tip 40 is preferably chamfered along an outer edge 48 of first surface 42 and along an outer edge 50 of second surface 44. Further, tip 40 is preferably chamfered at an edge 52 of second surface 44 that is adjacent to passive edge 26.

Referring to FIG. 5, drill bit 10 and support pad 30 are shown with the cutting forces. A normal cutting force at cutting edge 24 when drill bit 10 is in operation is indicated at 60. A tangential cutting force at cutting edge 24 during operation of drill bit 10 is indicated at 62. The resultant of normal cutting force 60 and tangential cutting force 62 is indicated at a resultant cutting force 64. Normal cutting force 60 is due to the interior walls of the bore hole pushing in, normally, on drill bit 10. Tangential cutting force 62 is a force exerted by the interior of the bore hole against the cutting action of cutting edge 24. Resultant force 64 is directed at support pad 30 in accordance with the present invention.

Figure 6:
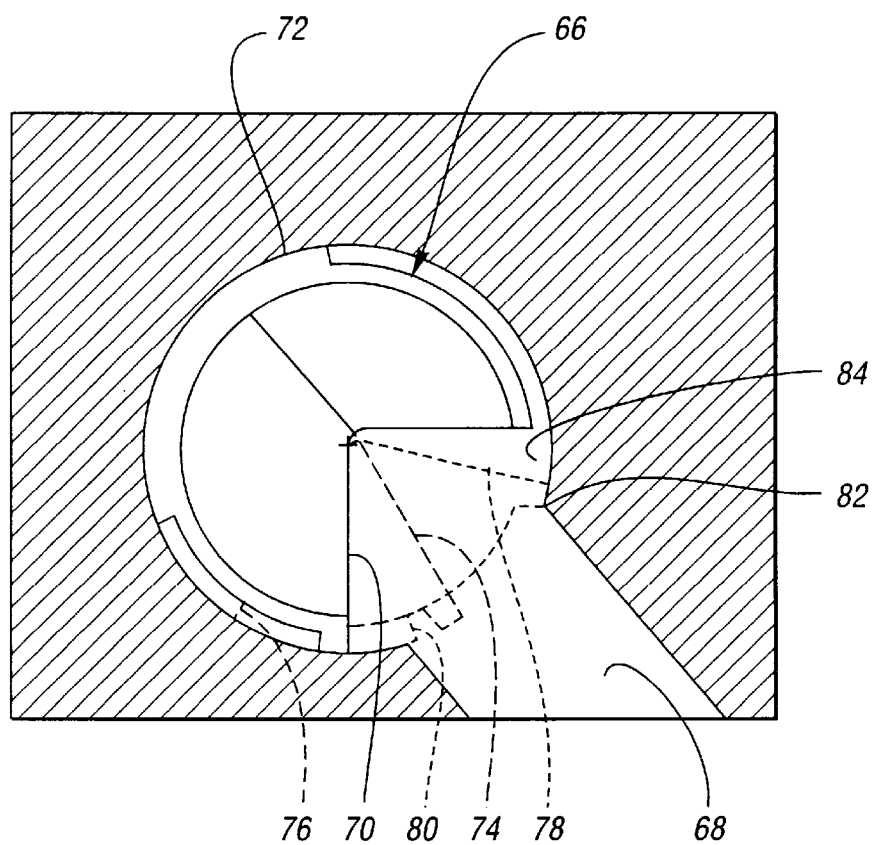
FIG. 6 is a schematic diagram illustrating the operation of a short-hole drill bit of the present invention for drilling a bore intersecting a blind bore.

With reference to FIG. 6, a drill bit 66 of the present invention is shown in operation. At a first instance, the cutting edge is indicated in solid line at 70, and the support pad is indicated in solid line at 72. At a second instance, the cutting edge is indicated in long dashed line at 74, and the support pad is indicated in long dashed line at 76. At a third instance, the cutting edge is indicated in short dashed line at 78, while the support pad is indicated in short dashed line at 80. As the cutting edge progresses along the interior wall of the bore hole it approaches blind bore 68. Support pad 72, 76, 78 prevents drill bit 66 from bending excessively. Thus, when the cutting edge moves across blind bore 68, because drill bit 66 is straight and not bent, the cutting edge smoothly leaves the area of blind bore 68 without gauging the intersection 82 of blind bore 68 with the bore hole 84 that is being drilled.

With reference to FIGS. 7–9, an alterative embodiment of a drill bit of the present invention is generally indicated at 90. Drill bit 90 has a unitary body 92 with a shank portion 94 and a working portion 96. Drill bit 90 is similar to drill bit 10 (FIGS. 1–4); however, drill bit 90 is shown having a twisted flute 98. Further, drill bit 90 is shown having a passage 100 extending axially through body 92 for routing coolant during operation.

It is to be appreciated that in preferred embodiments of the present invention the support pad extends through a portion of the drill bit body periphery that is substantially opposite the flute such that a resultant cutting force at the cutting edge is directed at the support pad. However, the positioning of the support pad, and the circumferential distance that the support pad extends may vary based on expected normal and tangential cutting forces for a given application for the drill bit.

With reference to FIG. 10, a block diagram depicts a method for short-hole drilling a workpiece in accordance with the present invention, and is generally indicated at 110. At block 112, a pilot hole is formed in the workpiece. At block 114, a short-hole drill bit is positioned at the pilot hole. The short-hole drill bit has a unitary body with a shank portion and a working portion, and has a support pad arranged such that a resultant cutting force is directed to the support pad to center the short-hole drill bit during operation.

At blocks 116 and 118, the support pad engages the pilot hole interior walls and a short-hole is then drilled. The support pad centers the short-hole drill bit during drilling (or reaming). It is to be appreciated that the pilot hole may simply be a shallow starter hole such that the short-hole drill bit removes a large amount of material to form the desired hole. It is to be further appreciated that the pilot hole may be a traditional full depth pilot hole such that the short-hole drill bit functions as a reamer.

Further, it is to be appreciated that the terms "short-hole drill bit" and "clean bore reamer" are used interchangeably to describe embodiments of the present invention, and that either of those terms or other similar terms are meant to encompass short-hole drill bits that are used for drilling and short-hole drill bits that are used for reaming. Still further, a suitable length to diameter ratio for a short-hole drill bit of the present invention is at most about 6 to 1. Of course, although length to diameter ratios of 6 to 1 or below are most suited for applications requiring short-hole drill bits of the present invention, length to diameter ratios greater than about 6 to 1 are possible. It is to be further appreciated that the suitable length to diameter ratios for short-hole drill bits of the present invention are far different than suitable length to diameter ratios for gun drills. In a gun drill, the length to diameter ratio may approach as much as 50 to 1. Thus, gun drills are far different than short-hole drill bits, and are used for different applications which typically include drilling but do not include reaming.

During testing, embodiments of the present invention produced excellent results when employed in reaming applications. It is believed that embodiments of the present invention are capable of reaming a hole such that roundness, straightness, and taper are all within 2 microns. Further, embodiments of the present invention have been found to be capable of reaming bores with such precision that size will repeat within about 2 microns. From tool to tool, size will repeat within about 5 microns. Of course, it is to be appreciated that a precision spindle and tool holder should be used when an application has strict tolerances. Of course, it is to be further appreciated that the capabilities of embodiments of the present invention described in this paragraph are exemplary, and have been found by testing. Short-hole drill bits of the present invention may be configured to perform to stricter specifications or looser specifications than those described immediately above, as required for a particular application, and as would be readily understood by one of ordinary skill in the tool designing arts.

It is to be appreciated that another advantage that may be achieved by embodiments of the present invention is that a flat bottom can be produced without a center relief, and without compromise to hole geometry. That is, in a preferred construction of a short-hole drill bit of the present invention, the cutting edge extends all the way to the tool tip to produce the flat bottom when cutting.

In one application, embodiments of the present invention allowed the inventor to go from leaving 150 microns of stock to hone, to leaving only about 75 microns of stock to hone after reaming. Thus, by employing embodiments of the present invention, the finish honing process became easier and less expensive to perform. In another application, the inventor was able to eliminate a costly honing operation because the short-hole drill bit of the present invention was able to meet tolerances for the part. Of course, the two application described in this paragraph are exemplary only, and the performance of a short-hole drill bit may vary based on a variety of factors that would be apparent to one of ordinary skill in the tool designing arts.

While the best mode for carrying out the invention has been described in detail, those familiar with the art to which this invention relates will recognize various alternative designs and embodiments for practicing the invention as defined by the following claims.

What is claimed is:

1. A short-hole drill bit for drilling short-holes wherein a depth of a drilled hole is generally not greater than a length of the short-hole drill bit, the short-hole drill bit comprising:
   a unitary body formed from a single piece of metal and having a shank portion and a working portion defined adjacent to the shank portion, the body defining a central axis and having a periphery, the body having an axial length of not significantly less than a desired depth for a drilled hole;
   a substantially V-shaped flute extending axially along the working portion, the flute defining a cutting edge and a passive edge at the body periphery; and
   a support pad located along a portion of the body periphery, the support pad being located with respect to the cutting edge based on a normal cutting force and a tangential cutting force at the cutting edge, such that a resultant cutting force is directed at the support pad to cause the support pad to center the short-hole drill bit during operation.

2. The short-hole drill bit of claim 1 wherein the flute is a straight flute.

3. The short-hole drill bit of claim 1 wherein the body is formed of a carbide.

4. A short-hole drill bit comprising:
   a unitary body having a shank portion and a working portion, the body defining a central axis and having a periphery, and wherein the body is formed of a carbide with about 10 percent Cobalt;
   a substantially V-shaped flute extending axially along the working portion, the flute defining a cutting edge and a passive edge at the body periphery; and
   a support pad located along a portion of the body periphery, the support pad being located with respect to the cutting edge based on a normal cutting force and a tangential cutting force at the cutting edge, such that a resultant cutting force is directed at the support pad to cause the support pad to center the short-hole drill bit during operation.

5. The short-hole drill bit of claim 1 wherein the body has an abrasive resistant coating.

6. The short-hole drill bit of claim 1 further comprising:
   a short pad located along a portion of the body periphery at the cutting edge.

7. The short-hole drill bit of claim 6 wherein the short pad extends less than about 10 degrees in a circumferential direction about the body periphery.

8. The short-hole drill bit of claim 1 wherein the support pad extends more than about 90 degrees in a circumferential direction about the body periphery.

9. A short-hole drill bit comprising:
   a unitary body having a shank portion and a working portion, the body defining a central axis and having a periphery;
   a substantially V-shaped flute extending axially along the working portion, the flute defining a cutting edge and a passive edge at the body periphery; and
   a support pad located along a portion of the body periphery, the support pad being located with respect to the cutting edge based on a normal cutting force and a tangential cutting force at the cutting edge, such that a resultant cutting force is directed at the support pad to cause the support pad to center the short-hole drill bit during operation, wherein the body working portion defines a tip with a first surface and a second surface, the first surface being located adjacent to the cutting edge, the second surface being located between the passive edge and the first surface, wherein the first surface is substantially perpendicular to the body central axis, and the second surface is chamfered with respect to the first surface and shares a common edge with the first surface.

10. The short-hole drill bit of claim 9 wherein a periphery of the tip is chamfered along an outer edge of the first surface and along an outer edge of the second surface.

11. The short-hole drill of claim 10 wherein the tip is chamfered at an edge of the second surface that is adjacent to the passive edge.

12. A short-hole drill bit for drilling short-holes wherein a depth of a drilled hole is generally not greater than a length of the short-hole drill bit, the short-hole drill bit comprising:
   a unitary body formed from a single piece of metal and having a shank portion and a working portion defined adjacent to the shank portion, the body defining a central axis and having a periphery, the body having an axial length of not significantly less than a desired depth for a drilled hole;
   a substantially V-shaped flute extending axially along the working portion, the flute defining a cutting edge and a passive edge at the body periphery; and
   a support pad along the body periphery, the support pad extending through a portion of the body periphery that is substantially opposite the flute such that a resultant cutting force at the cutting edge is directed at the support pad to cause the support pad to center the short-hole drill bit during operation.

13. The short-hole drill bit of claim 12 wherein the flute is a straight flute.

14. The short-hole drill bit of claim 12 wherein the body is formed of a carbide.

15. A short-hole drill bit comprising:
   a unitary body having a shank portion and a working portion, the body defining a central axis and having a periphery, and wherein the body is formed of a carbide with about 10 percent Cobalt;
   a substantially V-shaped flute extending axially along the working portion, the flute defining a cutting edge and a passive edge at the body periphery; and
   a support pad located along a portion of the body periphery, the support pad being located with respect to the cutting edge based on a normal cutting force and a tangential cutting force at the cutting edge, such that a resultant cutting force is directed at the support pad to cause the support pad to center the short-hole drill bit during operation.

16. The short-hole drill bit of claim 12 wherein the body has a TiCN coating.

17. The short-hole drill bit of claim 12 further comprising:
   a short pad located along a portion of the body periphery at the cutting edge.

18. The short-hole drill bit of claim 12 further comprising:
   a passage extending axially through the body for routing coolant during operation.

19. A short-hole drill bit comprising:
   a unitary body having a shank portion and a working portion, the body defining a central axis and having a periphery;
   a substantially V-shaped flute extending axially along the working portion, the flute defining a cutting edge and a passive edge at the body periphery wherein the cutting edge and the passive edge define an interior angle of about 90 degrees; and
   a support pad located along a portion of the body periphery, the support pad being located with respect to the cutting edge based on a normal cutting force and a tangential cutting force at the cutting edge, such that a resultant cutting force is directed at the support pad to cause the support pad to center the short-hole drill bit during operation.

20. A method for short-hole drilling a workpiece, the method comprising:
   forming a pilot hole in the workpiece;
   positioning a short-hole drill bit at the pilot hole, the short-hole drill bit having a unitary body having a shank portion and a working portion, the body defining a central axis and having a periphery with a substantially V-shaped flute extending axially along the working portion, the flute defining a cutting edge and a passive edge at the body periphery, wherein a support pad located along a portion of the body periphery, the support pad being located with respect to the cutting edge based on a normal cutting force and a tangential cutting force at the cutting edge, such that a resultant cutting force is directed at the support pad to cause the support pad to center the short-hole drill bit during operation; and
   forming the short-hole in the workpiece, wherein the support pad centers the short-hole drill bit during drilling.

* * * * *